April 2, 1935.  L. E. LUBBERS  1,996,162

FLEXIBLE AND RESILIENT VEHICLE COUPLING

Original Filed Oct. 23, 1931   3 Sheets-Sheet 1

Inventor
L. E. Lubbers.

April 2, 1935. L. E. LUBBERS 1,996,162
FLEXIBLE AND RESILIENT VEHICLE COUPLING
Original Filed Oct. 23, 1931 3 Sheets-Sheet 2
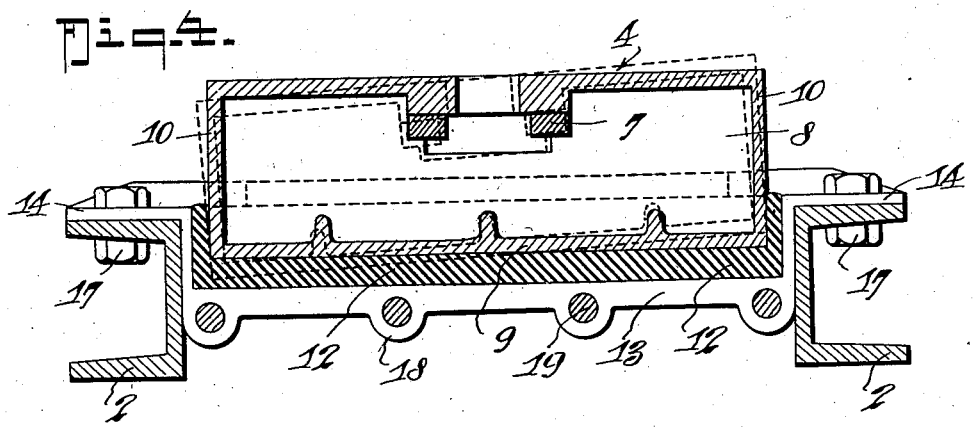
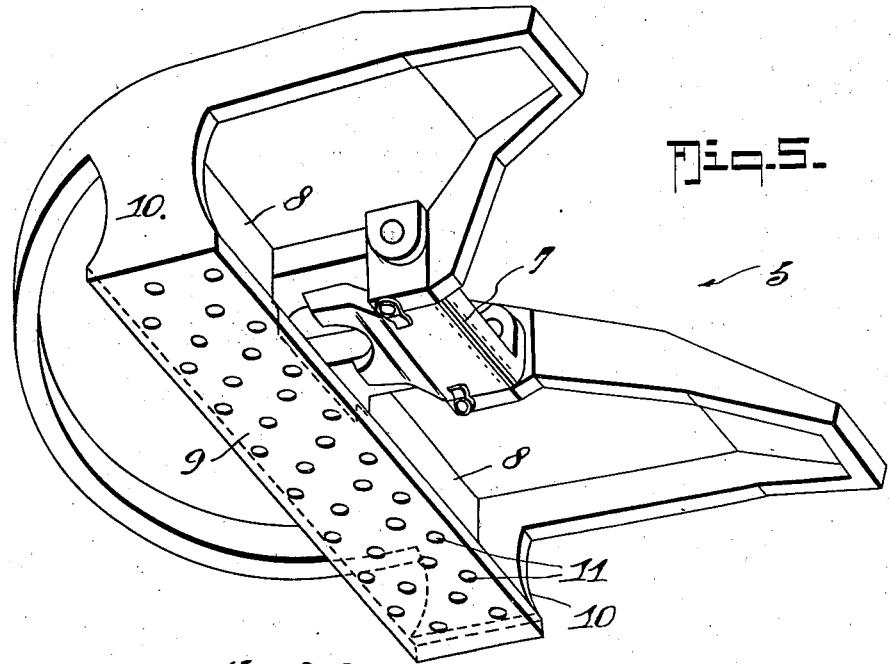
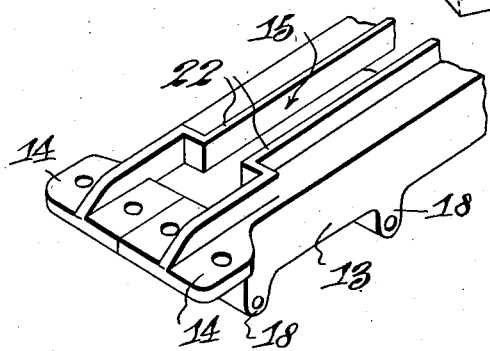
Inventor
L. E. Lubbers.
By Albert E Dietrich
Attorney

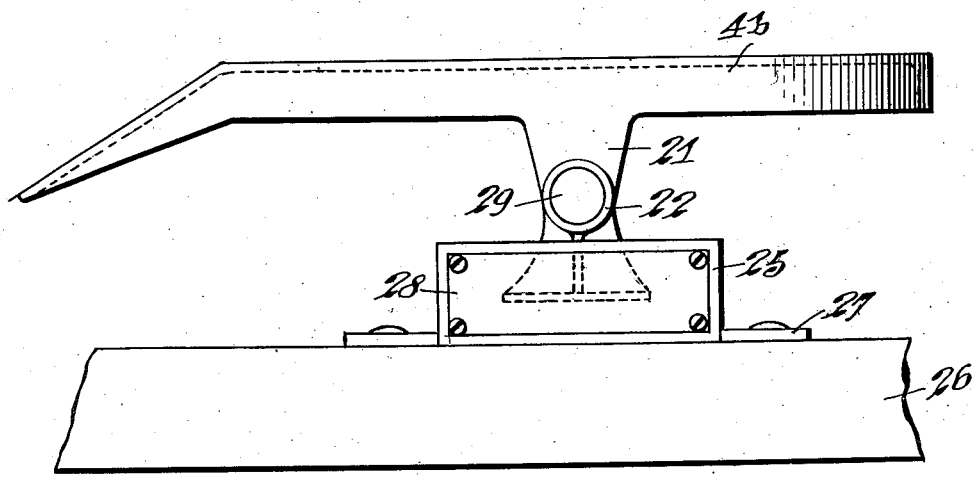
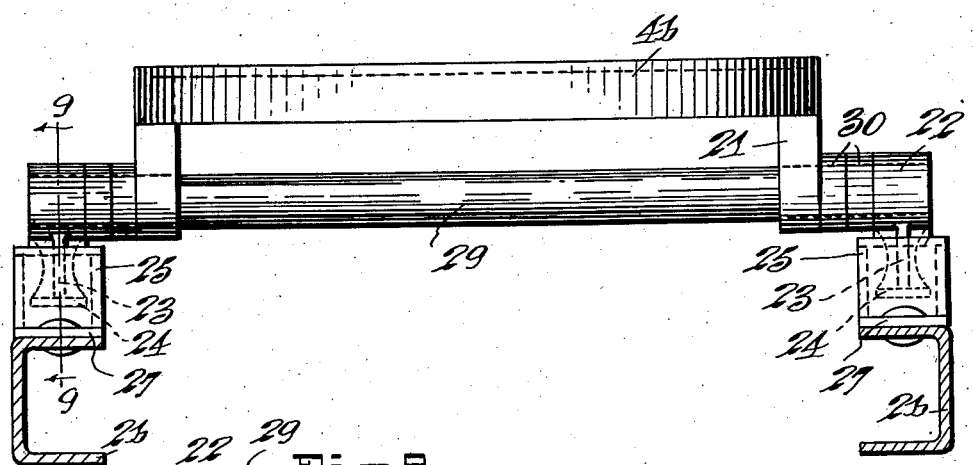
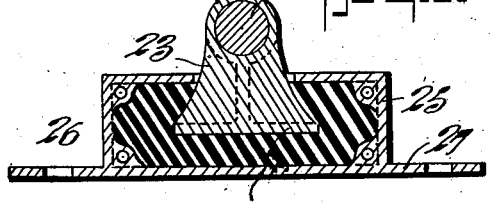

Patented Apr. 2, 1935

1,996,162

UNITED STATES PATENT OFFICE 1,996,162

FLEXIBLE AND RESILIENT VEHICLE COUPLING

Lubbert E. Lubbers, Stoughton, Wis., assignor to The New Stoughton Company, Stoughton, Wis., a corporation of Wisconsin Substitute for abandoned application Serial No. 570,484, October 23, 1931. This application November 24, 1933, Serial No. 699,611

10 Claims. (Cl. 280—33.1)

My invention relates to the art of land vehicles and it particularly has for its object to provide a new and useful means for mounting or connecting any type of vehicle to a power unit. In other words, the object of this invention is to provide a permanent or detachable, flexible and resilient device for coupling and connecting and/or supporting a trailer (or other vehicle or device used for the purpose of or in connection with the transporting of passengers, freight, cattle or any other article or commodity) to and with any self-propelled vehicle or any vehicle drawn by means of any known power.

Further, it is an object to improve the operation of a tractor-trailer truck and a semi-trailer by eliminating the shocks and vibrations to which a combination of vehicles is usually subjected, thereby greatly reducing the maintenance cost of both vehicles.

Further, it is an object to provide means whereby if the trailer gets out of alignment with the tractor sufficient play is provided to act as a hinge to enable the coupling to adapt itself to irregularities in alignment as well as to take up the shocks of too sudden coupling.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which—

Figure 4 is a transverse section on the line 4—4 of Figure 3 showing how horizontal rocking action of the fifth wheel member may take place, the normal position of the parts being indicated in full lines and the tilted position in dotted lines.

Figure 1:
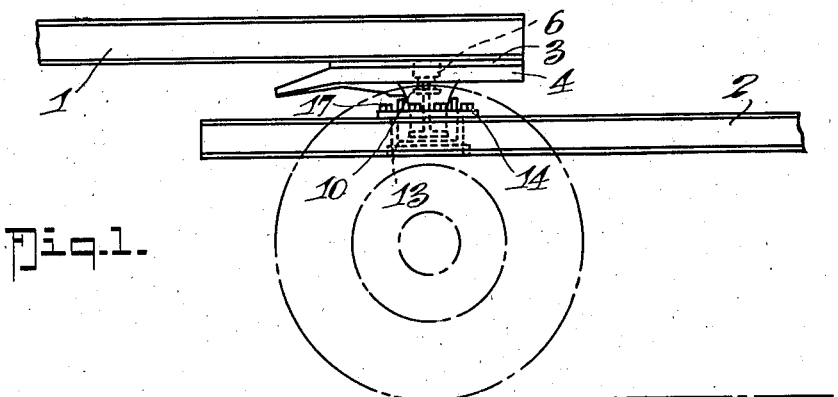
Figure 1 is a side elevation somewhat diagrammatic showing my invention as applied to the lower fifth wheel of a vehicle coupler.

Figure 5 is a detail perspective view of the bracket element and a fifth wheel member which carries it.

Figure 6 is a detail perspective view of the mounting element.

Figure 7 is a detail side elevation of my invention as applied to the mounting of the bracket commonly used with a conventional type of rocking fifth wheel.

Figure 8 is an elevation of the same looking in the direction of the arrow in Figure 7.

Figure 9 is a detail longitudinal section on the line 9—9 of Figure 8.

In the drawings, in which like numerals of reference indicate like parts in all of the figures, 1 represents a trailer frame and 2 a truck or tractor frame. These frames are coupled together by means of a fifth wheel type coupler which consists of two units, an upper unit and a lower unit. In the arrangement of the invention shown in Figure 1 the upper unit is indicated by the numeral 3 and the lower unit by the numeral 4, whereas in the embodiment shown in Figure 2 these units are indicated by 3a and 4a respectively.

The upper unit includes a pin 6 while the lower unit has a plate or casting with a wedge shaped opening terminating into a slot which permits pin to enter as in 5, and find its seat in the bearing portion of the lower unit in which place it is held by any suitable latch or locking device as in 7.

As the specific constructions of the members 3 and 4 per se are immaterial to the present invention, further illustration and descriptions thereof are deemed unnecessary.

My present invention resides in providing a flexible elastic connection between one or the other or both of the fifth wheel members and the vehicle frames which carry them. This flexible and elastic connection comprises a cross bracket consisting of a transverse web 8 and a base web 9 and end webs 10, the base web being provided, if desired, with holes 11 in order that when the bracket is embedded in cushion rubber 12 located in the sectional boxing 13 it will be interlocked with that rubber mechanically and/or by vulcanization, or if desired, two separate rubber blocks or cushions shaped to conform to the web 8 and the inside of the box 13, may be employed.

The sectional boxing 13 has ears 14 for bolting to the vehicle frame and it has a longitudinal opening 15 with T ends 16 to pass the webs 8 and 10 out of the boxing. The boxing is bolted to the frame of the vehicle by suitable bolts 17.

The boxing also has suitable lugs 18, having cross bolts 19 which secure the edges of the boxing together.

20 designates reinforcing beads around the opening 15—12.

Figure 2:
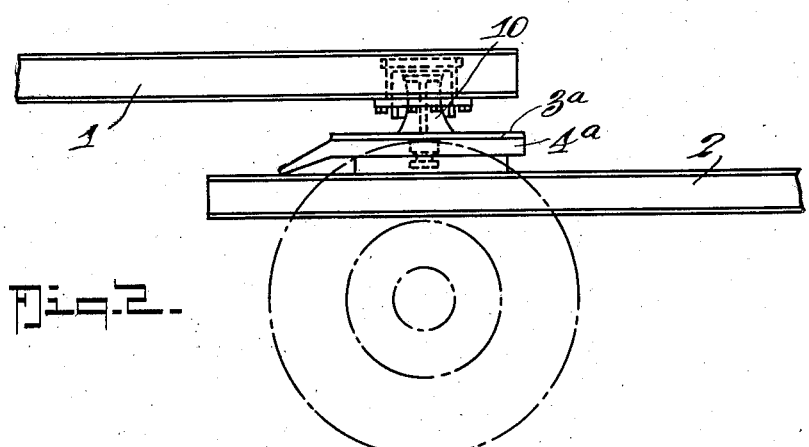
Figure 2 is a view similar to Figure 1 showing the invention as applied to the upper member of a fifth wheel of a vehicle coupler.
Figure 3:
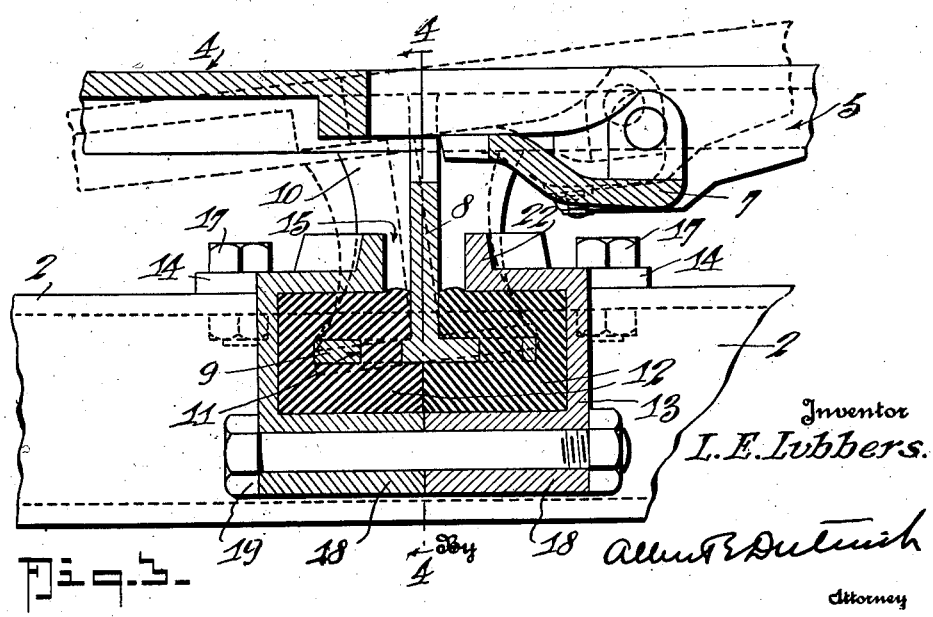
Figure 3 is an enlarged cross section of the device showing how the front and back rocking action of lower (resiliently mounted) fifth wheel member may take place, the normal position of the parts being indicated in full lines and the tilted position in dotted lines.

As shown in Figure 1, the web may be formed on the underside of the lower plate 4 and the boxing be mounted on the truck frame 2, or as shown in Figure 2 the web may be a part of the upper plate 3 and the boxing mounted on the trailer frame 1, as may be desired, or both upper and lower fifth wheel members 3 and 4 may be provided with the flexible, resiliently-mounted web if so desired, but as that would be a mere combination of parts of Figures 1 and 2 further illustration is thought to be unnecessary.

My present invention may readily be applied to the mounting brackets of conventional type rocking fifth wheels. This is illustrated in Figures 7 to 9 inclusive, by reference to which it will be observed that 4—b represents the contact plate of the lower fifth wheel which has lugs 21 for the rocker shaft 29 that is mounted in the bearing portions 22 of the rocker shaft brackets. These brackets include the vertical webs 23 and base flanges 24 set in rubber blocks or resilient cushions of compressible material 26 within the boxes 25.

The boxes 25 have removable cover plates 28 through which the cushions may be inserted and removed at will and the boxes also have flanges 27 by means of which they may be secured to the frame 2—b of the truck or tractor.

Spacer washers 30 are used when necessary to compensate for variations in frame widths.

It will be observed that with the construction herein disclosed the resiliency of the rubber blocks or cushions permits the plate of the fifth wheel mounted thereon to tilt at the angle required to lift and engage the pin which is a part of the other fifth wheel member. This tilting effect in fifth wheel structures used prior to my invention is obtained by the conventional and patented types of fifth wheel through cross shafts mounted on brackets to give the plate of the fifth wheel a hinge effect and the rocking or tilting is limited to only one direction, namely forward or backward or up and down longitudinally with the tractor truck. In addition to this movement, the rubber blocks or cushions of my invention provide the necessary horizontal or cross up and down or rocking motion which a coupler or fifth wheel connection is subjected to when one wheel of the truck or trailer drops into a depression or travels over a raised object.

The use of the flexible resiliently mounted fifth wheel member or members assures perfect alignment and a full contact surface between the lower plate 4 of the fifth wheel proper and the upper plate 2 and its pin 6 regardless of the difference in angle of the tractor and trailer at the time of contact or coupling.

The most unfavorable criticism of the conventional type of fifth wheel in use prior to my invention is the impact at the time of engaging. By the use of my rubber blocks or cushions this destructive shock is entirely eliminated because the plate on the lower fifth wheel unit and the truck-tractor frame are completely insulated by these rubber blocks or cushions and at no time do they permit a metal to metal contact between the lower fifth wheel unit and the truck frame. These rubber blocks or cushions are so constructed that the cushioning effect is constant right through to the point of absolute connection, thus the impact is no greater at the time of final connection than at the time of the first slight contact. The construction of these rubber blocks or cushions allows for the displacement of rubber as the pressure of the tractor becomes greater at the time of engaging.

Furthermore, through the resiliency of these rubber blocks or cushions, the plate of the fifth wheel which is carried by the web embedded in the rubber is permitted to partially rotate or twist sufficiently to create a better alignment in the event that at the time of the engaging process the pin of the other fifth wheel member is not directly in line with the guide slot on the resiliently mounted fifth wheel member.

The fifth wheel member which is resiliently mounted resumes its normal position at the slightest forward movement of the tractor. This function is not possible to perform by the types of fifth wheels heretofore known, because the cross shafts are stationary and do not permit a rotating or twisting action. It must therefore bring about such alignment by lifting and sliding the entire trailer load into position and this creates a terrific strain on the coupling pin while travelling on one side or the other of the guiding slot until the pin has entirely engaged with the fifth wheel member with which it cooperates.

Further, after the tractor and trailer have been permanently connected, these rubber blocks or cushions act as a shock absorber while the trailer is in operation, practically eliminating road shocks and vertical and horizontal distortion of both the tractor and trailer chassis. This feature greatly reduces the wear on the tractor and trailer and materially lowers the maintenance costs.

While I have specifically disclosed a rubber filler in which the web is embedded other flexible resilient means may be employed (including springs or any liquid by hydraulic methods or otherwise), the essence of the invention in its broad aspect being the mounting of the fifth wheel member on the vehicle through the medium of a flexible and resilient mounting means. The flexible or resilient materials used in this coupling are contained within a compartment or metal box suspended or attached in any suitable manner by plates of any material or brackets forming a connection between the plate and the bracket attached to the power unit, the plate of the fifth wheel having a sliding contact with one another.

While in this description we have used the words "box" and/or "receptacle" to describe the part in which the rubber or resilient material is contained, we desire to define the word box as meaning any receptacle or container of any shape or form or any other means of supporting or suspending the cushion material for the purpose of obtaining this flexibility.

This application is a substitute for my application filed October 23, 1931, Serial Number 570,484. In this application no specific claim is made to the embodiment of the invention illustrated in Figures 7, 8 and 9, the specific claims being limited to the embodiments shown in Figures 1 to 6, inclusive, it being the intention that this application shall contain only the claims generic to all species and those specific to the embodiments of the invention shown in Figures 1 to 6, inclusive.

From the foregoing description, taken in connection with the accompanying drawings, it is thought the complete construction, operation and advantages of my invention will be clear to those skilled in the art to which it relates.

What I claim is:

1. In vehicle couplings wherein is provided an upper and a lower coupling member adapted for cooperative connection, means to mount one of said members on one vehicle and means to mount the other of said members on another vehicle, at least one of said means including a stationary receptacle, a web of I-shape in horizontal cross section projecting rigidly from one of the coupling members into said receptacle, and a base web connected to said I-shaped web and located within the receptacle, and elastic means in said receptacle for floatingly mounting said webs in said receptacle, thereby elastically connecting the coupling member with the receptacle, said elastic means comprising a cushion of rubber in which a portion of said web is embedded.

2. In vehicle couplings of the fifth wheel type, a lower fifth wheel member and an upper fifth wheel member with provisions swivelly to connect said fifth wheel members together, a transverse bracket carried by one of said fifth wheel members, a supporting receptacle into which said bracket projects, a cushion rubber filler in said receptacle and embedding the projecting portion of said bracket, that portion of the bracket which is embedded in the rubber filler comprising a base web and a web of I-shape in horizontal cross section projecting from the base web at right angles thereto.

3. In vehicle couplings of the fifth wheel type, a lower fifth wheel member and an upper fifth wheel member with provisions swivelly to connect said fifth wheel members together, a transverse bracket carried by one of said fifth wheel members, a supporting receptacle into which said bracket projects, a cushion rubber filler in said receptacle and embedding the projecting portion of said bracket, that portion of the bracket which is embedded in the rubber filler comprising a base web and a web of I-shape in horizontal section projecting from the base at right angles thereto, said receptacle comprising separable sections, means securing said sections detachably together, means whereby said receptacle and the other of said fifth wheel members may respectively be secured to the vehicles to be coupled.

4. In vehicle couplings, an upper coupling member and a lower coupling member carried respectively by a pair of vehicles, the lower member including a transversely disposed bracket, a transversely disposed supporting receptacle on one vehicle having an opening at its top through which said bracket projects, elastic resilient means held within the receptacle, and supporting the part of said bracket which is within the receptacle, and means to anchor said bracket to said elastic resilient means, said elastic resilient means comprising a suitable incompressible filler and said bracket including a flange of greater area than that of the receptacle opening, that portion of the bracket which is located within the receptacle comprising a base web and a web of I-shape in cross-section extending from the base web at right angles thereto.

5. In vehicle couplings, an upper fifth wheel coupling member and a lower fifth wheel coupling member carried respectively by a pair of vehicles, the upper member including a transversely disposed bracket, a transversely disposed supporting receptacle located on one vehicle and having an opening through which said bracket projects, incompressible elastic resilient means held within the receptacle and suspending the part of said bracket which is within the receptacle, and means to anchor said bracket to said incompressible elastic resilient means.

6. In vehicle couplings, an upper coupling member and a lower coupling member carried respectively by a pair of vehicles, the upper unit including a bracket, a supporting receptacle on the vehicle having an opening through which said bracket projects, incompressible elastic resilient means held within the receptacle and floating the part of said bracket which is within the receptacle, and means to anchor said bracket to said elastic resilient means, said elastic resilient means comprising a suitable filler and said bracket including a flange of greater area than that of the box opening.

7. In fifth wheel structures, a lower unit and an upper unit, one of said units having a pivot pin provided with a shank and a head, the other unit having a slotway flared at its outer end and constricted at its inner end to fit the shank of said pin, a releasable pin retaining device on said other unit, a transverse bracket with a base flange carried by said other unit, and a supporting box into which said bracket projects, and in which said base flange is located, a cushion rubber filler in said box and embedding the projecting portion of said bracket and said base flange, the projecting portion of said bracket being of I-shape in horizontal cross section.

8. In fifth wheel structures, a lower unit and an upper unit, one of said units having a pivot pin provided with a shank and a head, the other unit having a slotway flared at its outer end and constricted at its inner end to fit the shank of said pin, a releasable pin retaining device on said other unit, a transverse bracket carried by said other unit, and a supporting box into which said bracket projects, a cushion rubber filler in said box and embedding the projecting portion of said bracket, said box comprising separable sections, means securing said sections detachably together, and means by which said box may be mounted on and between the sides of the frame of a tractor.

9. In vehicle couplings of the fifth wheel type, a lower fifth wheel member and an upper fifth wheel member with provisions swivelly connecting such fifth wheel members together, a transverse bracket carried by one of said fifth wheel members, a supporting receptacle into which said bracket projects, a cushion rubber filler in said receptacle and embedding the projecting portion of said bracket, said bracket being mounted to float in said receptacle.

10. In vehicle couplings wherein is provided an upper and a lower fifth wheel coupling member adapted for cooperative connection, means to mount one of said fifth wheel members on one vehicle and means to mount the other of said fifth wheel members on another vehicle, at least one of said means including a stationary receptacle, a web having a vertical and a horizontal flange projecting rigidly from one of the coupling members in the receptacle, an elastic incompressible filler filling said receptacle and embedding said web whereby the web is mounted in said receptacle for universal movement.

LUBBERT E. LUBBERS.